United States Patent [19]

Ramsauer

[11] Patent Number: 4,827,568
[45] Date of Patent: May 9, 1989

[54] VISIBLE 180 DEGREES HINGE

[76] Inventor: Dieter Ramsauer, Am Neuhauskothen, D-562- Velbert 11, Fed. Rep. of Germany

[21] Appl. No.: 142,458
[22] Filed: Jan. 11, 1988

[30] Foreign Application Priority Data

Jan. 10, 1987 [DE] Fed. Rep. of Germany ... 8700444[U]

[51] Int. Cl.$^4$ .......................... E05D 7/10; E05D 7/12; E05D 5/10
[52] U.S. Cl. ........................................ 16/266; 16/254; 16/260; 16/265; 16/382; 16/386
[58] Field of Search ................ 16/254, 266, 273, 382, 16/386, 389, 260, 265, 380, 381, 387

[56] References Cited

U.S. PATENT DOCUMENTS

| | | | |
|---|---|---|---|
| 1,410,840 | 3/1922 | Shults | 16/260 |
| 1,528,752 | 3/1925 | Bergh | 16/389 |
| 3,137,529 | 11/1938 | Ferris | 16/386 |
| 2,578,610 | 12/1951 | Stone | 16/135 |
| 2,677,147 | 5/1954 | Phillips | 16/266 |
| 3,921,225 | 11/1975 | Suska | 16/273 |
| 4,630,332 | 12/1986 | Bisbing | 16/273 |

FOREIGN PATENT DOCUMENTS

| | | | |
|---|---|---|---|
| 3246398 | 12/1982 | Fed. Rep. of Germany . | |
| 2576959 | 8/1986 | France . | |
| 164950 | 10/1958 | Sweden | 16/386 |
| 374310 | 6/1932 | United Kingdom | 16/128 |

Primary Examiner—Nicholas P. Godici
Assistant Examiner—William Scott Andes
Attorney, Agent, or Firm—Darby & Darby

[57] ABSTRACT

An externally visible 180 degree hinge for switching boxes having a first bearing block attached to a box casing and a U-shaped second bearing block surrounding the first. The second bearing block is attached to a door leaf and pressed into an edge area of the door leaf so that an axis of rotation of the hinge is outside a corner formed by an edge of the door.

21 Claims, 6 Drawing Sheets

VISIBLE 180 DEGREES HINGE

BACKGROUND OF THE INVENTION

1. Technical Field

The invention relates to an externally visible 180 degree hinge for switching boxes, comprising a first bearing block attached to the box casing and a second bearing block which surrounds the first bearing block, is U-shaped, bolted to the door leaf or attached by means of clamping bolts, the second bearing block being pressed into a recess arranged at the edge area of the door leaf and thus surrounding the recess edges, the axis of rotation of the hinge being outside the corner formed by the edge of the door leaf.

2. Discussion of the Prior Art

A 180 degree hinge also by the applicant of the present hinge, which can be used for switch boxes in series, is known from catalogue sheet C085.4 of the company EMKA Beschlogteile GmbH & Co. KG, printed in Mar. 1986. This 180 degree hinge is suitable for salient doors and can be used both left and right, with a maximum opening angle of 180 degrees in applications in series boxes, so that extremely easy access is possible to the contents of the box as well as the components attached to the door leaf.

The known EMKA hinge has considerable advantages over earlier designs. One advantage exists in the fact that the welding process for attaching the second bearing block to the door leaf, or the use of fixing bolts for the door leaf (if this is envisaged as an alternative) can be omitted, whereas for attaching the first block either a cap screw or a screw bolt or even a stay bolt (welding bolt) can be used.

Figure 7:
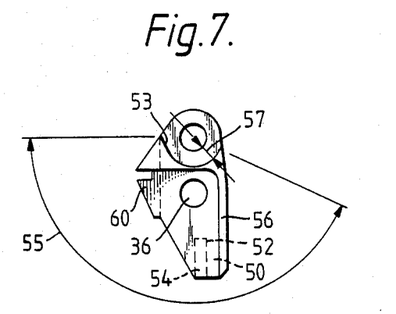
FIGS. 7 and 7a are top views of the second U-shaped block of the hinge in FIG. 4 in two variants.

A similar U-shaped block held in a door leaf by means of a recess is shown in FIG. 7 of European patent application 85114300.8.

However, in order to remove the door with the known 180 degree hinge arrangements with clamping pin devices in order to obtain better access to the interior of the box for wiring, for example, a considerable amount of work is necessary. Either the screw connections between box casings and the several hinges of each door have to be unscrewed, or the bolts of the clamping device for the various hinges have to be removed, which then causes the hinges to fall apart. Subsequent reassembly is difficult, particularly if three hinges have to be assembled at the same time and because of the necessary precise orientation of the individual hinge components.

An even more serious disadvantage is that the older state of the art can only be applied in the case of individual boxes, not series boxes.

Hinges for a door with a 180 degree opening angle which can also be used for series boxes, are disclosed in DE-OS 32 46 398 by the applicant. The series box hinge arrangement proposed in this publication requires space next to the door leaf corresponding to the basic width of both hinge blocks. For this reason when a 180 degree hinge of this type is used for series boxes the door leaf has to be narrower than the box casing by a little more than the basic width of the hinge, for aesthetic reasons this gap also provided at the top and bottom of the door leaf. This hinge also requires asymmetrical fixing borings, so that a prepared, i.e. holed, door leaf cannot be used for both left and right unless additional borings are provided. It would be more advantageous if, in a 180 degree hinge, the door leaf essentially covers the surface of the box casing so that only a narrow edge of 1 to 3 mm, for example, remains for taking up manufacturing tolerances. The 180 degree hinge known from the aforementioned catalogue sheet permits this surface covering door leaf size and can still be used in series boxes. In addition, if necessary, fixing to the door leaf can be implemented without screw holes. It is also possible to interchange hinge types (e.g. replacing a 180 degree hinge for individual boxes, as illustrated in catalogue sheet C085.2 for example, by a 180 degree hinge for series boxes in accordance with catalogue sheet C085.4), without modifications having to be made to the door leaf or box casing, with the possibility of use on both left and right remaining.

SUMMARY OF THE INVENTION

The aim of the present invention is to further improve the above, already very advantageous, 180 degree hinge. One disadvantage of this hinge is that although the door leaf can be unhinged, the clamping bolt has to be removed from all the hinges on the door leaf. There are applications in which several switching boxes located next to each other have to be internally accessible at the dame time in order to carry out wiring in a rational manner. In these cases it would be advantageous if the switching box door could be dismantled in the simplest way possible without a bolt having to be removed and then reinserted when the door is reassembled. The insertion of bolts can cause problems, for example, if extensive switching devices are arranged on the inner surface of the door leaf which limits the accessibility to the hinge area.

The hinge of the type described above should therefore be improved and further developed so that the door can be taken off its hinges without a bolt having to be removed, with the hinge being designed in such a way that there is axial fixing when the door is closed. If possible the hinge should be unhingeable in a position in which the hinge is easily visible, thus facilitating preliminary fixing in reassembly. Vis-a-vis the hinge known from catalogue sheet C085.4 the external appearance should not be detracted from and it should also be possible to use screw fixing to the door leaf instead of clamping bolt fixing if it is required, as, for example, is shown in a similar way in FIG. 3 of aforesaid European patent application 85114300.8.

In place of the clamping bolt the applicaiton of corresponding attachment screws should also be possible.

This problem is solved in that the U-limb of the U-shaped second bearing block is shortened in such a way that its end surrounds the bearing block held by the other U-limb over a certain angle at a constant or variable radial distance from the bearing bolt, and in that the first bearing block has an attachment in the area of its bearing eye arranged in the radial gap annularly surrounding the bearing bolt. These measures make for a design, which within certain limits of the angle of opening of the door, ensures simple removal of one part of the hinge from the other part of the hinge, without any bolts or other parts having to be removed from the door leaf. All the advantages of the hinge known from catalogue sheet C085.4 are thereby maintained.

According to a further development of the invention the first bearing block has a bearing eye cross section with regard to the second bearing block which, allows this cross section to be pushed through the space formed by the variable radial gap in the direction of pivot when in an open door position. This position could correspond to a door opening angle of almost 180 degrees, preferably 150-190 degrees, particularly 170-180 degrees, or, more advantageously a door opening angle of almost 100 degrees, preferably 80 to 120 degrees, particularly 90 to 100 degrees.

Usually it will be advantageous if the lower limb is the shortened U-limb of the bearing block when assembled, because the door will be stably supported in the hinge without additional fixing of the bearing bolt. It has been shown to be of particular advantage if the bearing bolt is held in a through boring or pocket boring in the unshortened U-limb of the second bearing block by means of pressing and is in the shape of a truncated cone at its free end. The latter feature facilitates hanging further. Easier hanging is also achieved through preliminary fixing if, in accordance with a further development, the bearing bolt is of such a length that its free end terminates within the shortened U-limb area and thus leaves a preliminary fixing area free.

According to another embodiment, in order to reduce bearing friction, the first bearing block can have an annular recess for accommodating a sliding ring, such as a plastic ring in the support area of its attachment with the bearing eye.

However, the bearing bolt can also begin at the first block and be of such a length that when its tip enters the corresponding (upper) bearing eye of the second bearing block, the cross section of the first bearing block is already partly in the radial gap of the second bearing block.

Although the 180 degree hinge featured has advantages when used in single boxes, the inventions advantages become particularly important in applications in series boxes. This is because it is of particular advantage if the rotational axis of the hinge is outside the corner area formed by the edge of the door leaf, so that the hinge bolt is at a distance M in front of the door leaf's external surface, which corresponds to distance N between the central point of the bearing bolt and the tangent parallel to the door leaf's external surface at the point of the bearing component projecting furthest.

Here it is also an advantage if the 180 degree hinge is provided with the hinge blocks having a width requirement B, which is twice as large as diameter D of the hinge bolt and the distance M is less than half of width requirement B.

For aesthetic reasons it is an advantage if, in accordance with a further embodiment, the first bearing block forms a continuation surrounding the free end of the bearing bolt. This continuation essentially fills the space left by the shortened U-limb of the second block when the hinge parts are in the operational position.

The second bearing block can be fixed in the recess by means of cap screws passed through the metal sheet of the door leaf or a clamping bolt device passing through the hinge is provided. This device extends over the recess areas to the corner area formed by the edge thereby holding the second block in the recess, the clamping bolt device being in the form of two locking screws which are screwed into threaded borings in the U-limbs of the second bearing block.

This type of hinge is particularly suitable for series boxes if its hinge axis is formed by a first bearing bolt which passes through corresponding coaxial borings in the first bearing block and in the limb of the second bearing block surrounding the first bearing block (while the other limb does not require such a boring due to its shortening). The clamping bolt device is formed of two screws, more particularly locking screws, which are screwed into threaded borings in the limbs of the second bearing block. Locking screws provide particularly high resistance to shaking because they are clamped into the threaded boring due to their corresponding threaded design. A further advantage of the arrangement of locking screws in place of a through clamping bolt is that the first block, which is surrounded by the second block, turns about an axis which does not correspond to the axis of the clamping bolt device. Therefore, the first bearing block, must be designed in such a way that pivotting about the bearing bolt is not hindered if the clamping bolt passes through the block. By using locking screws there is no need for a special design of the first bearing block. The first bearing block has a laterally opened boring for the clamping bolt device, which enables the clamping bolt to be swung out from the area of the first bearing block in order to open the door.

If the bearing bolts are not to be kept extractable for other dismantling purposes, they can be provided with ribbing at one end in order to form a pressed fit with the corresponding boring area of the second block. In a simple manner this guarentees that the bearing bolt does not accidently fall out of the bearing. This feature also greatly simplifies the initial assembly of the hinge.

A further simplification of the initial assembly for interchanging of hinge types can be provided by the second U-shaped block forming a first groove in the link section of the U for surrounding the vertical door leaf recess edge, as envisioned in catalogue sheet C085.4. By using a second groove or stop face in the limb area of the U forming second block for surrounding the horizontal door leaf recess, the second block is anchored in the door leaf recess with appropriate pressing of the groove with regard to the door leaf strength in such a way that before insertion of the clamping bolt device the second block remains in the recess, which thus facilitates subsequent fixing by means of locking screws, clamping bolt or countersunk screws for instance. Holding of the second block in the door leaf recess is further improved if one side of the second groove is formed by the blunt end of a wedge increasing in the direction of insertion. This measure eliminates the need to provide the groove with a precise, tight press fit with regard to the door leaf metal because the wedge-shaped projections result in a clip-type arrangement which makes for very stable fastening of the second block in the recess, even if the door leaf recess edge still has some play.

The first bearing block can be a metal cut component. The bearing boring is formed by a metal roll and the fixing surface of the bearing block is formed by a metal edge into which a thread is cut or pressed or which has a threaded bolt in a corresponding boring, which may be threaded if necessary. The corresponding bearing block could then be molded from plastic.

In accordance with another embodiment of the invention, the first bearing block has a foot section which can be fixed to the body of the box by means of a fixing arrangement and has an axis lying outside the parts of the first bearing block containing the bearing eye, these parts with the foot being made more rigid with a strengthening rib or strengthening bead. It is also advantageous if the foot of the first bearing block has a greater axial extension than the other parts supported by this foot and if the foot has fixing devices outside the other parts, more particularly two such fixing devices. For interchanging purposes it is useful if the fixing devices are arranged at certain points so that the corresponding fixing points on the spar of the box body are centrally located.

BRIEF DESCRIPTION OF THE DRAWINGS

The invention will be described in more detail below with the aid of examples of embodiments shown in the diagrams.

DETAILED DESCRIPTION OF THE PREFERRED EMBODIMENT

Figure 1:
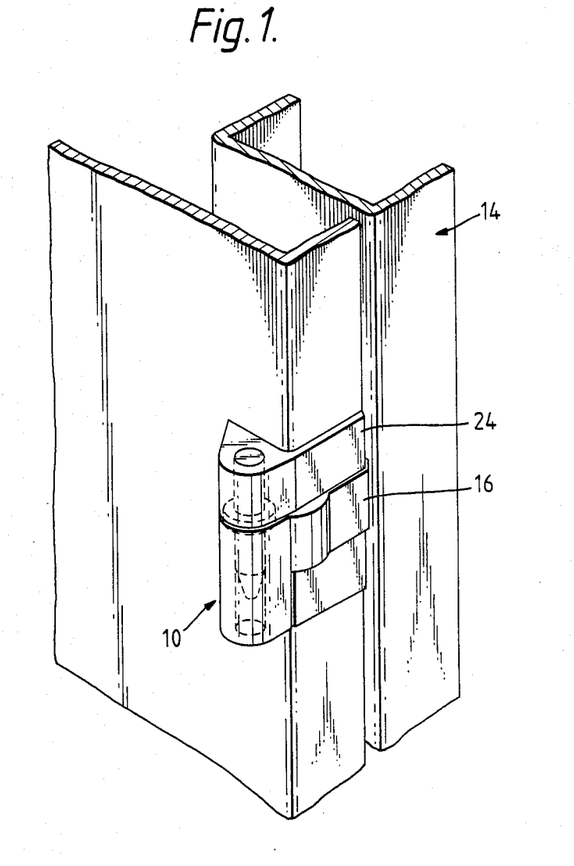
FIG. 1 is a perspective view of an embodiment of the 180 degree hinge according to the invention when assembled.
Figure 3:
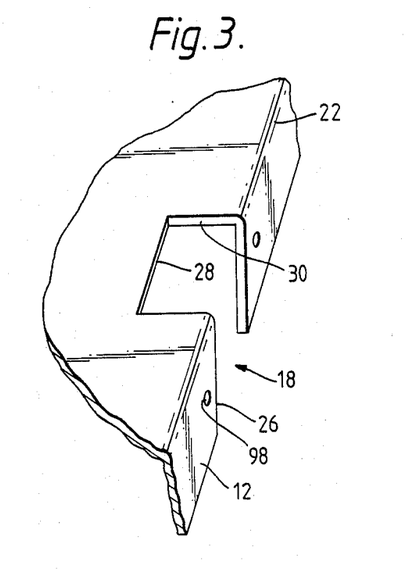
FIG. 3 is a perspective view of the recess in the door leaf in which the second block is mounted.
Figure 4:
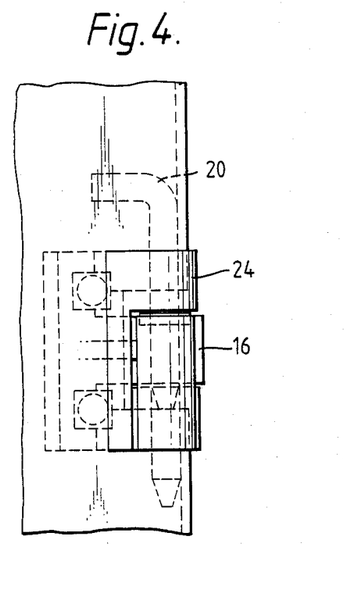
FIG. 4 is a side view of one embodiment of the hinge according to the invention using a clamping bolt.
Figure 12:
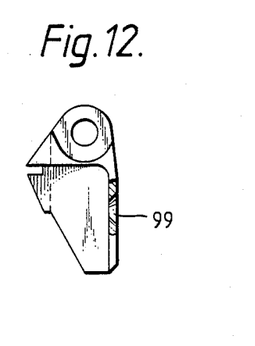
FIG. 12 is a view similar to that in FIG. 7 into the second U-shaped block, here fixed by means of countersunk screws.

FIG. 1 is a perspective view of a first embodiment of the present invented, externally visible 180 degree hinge, shown as hinge 10. The hinge comprises a first block 16 which is attached to the box casing 14 by means of screw bolt 13 (see FIG. 5) and a second block 24 which surrounds the first block 16. The second block is U-shaped and attached to the door leaf 12 by means of a clamping bolt arrangement 20 (FIG. 4) or 120 (FIG. 5) or screws (FIG. 12). The second block 24 is inserted into a recess 18 in the edge area 22 of door leaf 12, as can be seen from FIGS. 3 and 5 for example. The second block 24 surrounds door leaf recess edges 26,28. The clamping bolt arrangement, which in FIG. 4 is in the form of an angled bolt, extends across the width of recess 18 into the corner area 30 formed by recess 22, thereby holding the second block 24 firmly in the recess 18.

As can be seen in FIGS. 4, 8, 9, and 10, second block 24 is U-shaped so that it surrounds the first block 16 in a forked manner with only slight axial play when the door is in the closed position. The bolt 20 which can be seen in FIG. 4 penetrates through borings 36, 37 in the two fork arms 32, 34 of the U-shaped second block 24 as well as a recess 38 in first block 16, see FIGS. 7,9,10,11 and 14.

Figure 5:
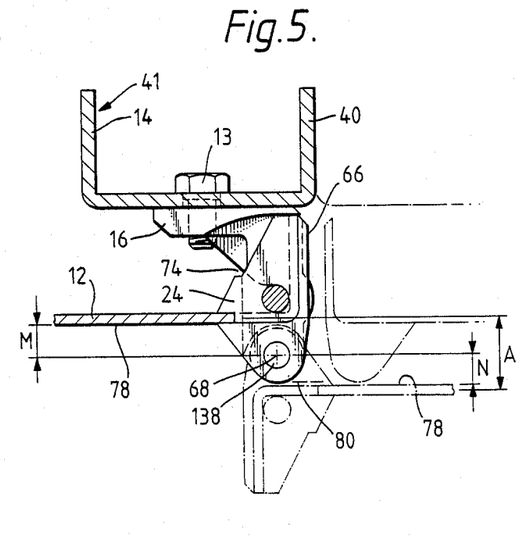
FIG. 5 is an axial cross section of the embodiment in FIG. 4.
Figure 17:
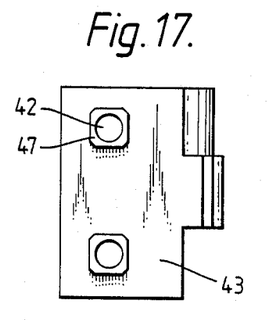
FIG. 17 is a front view of the block according to FIG. 14.
Figure 18:
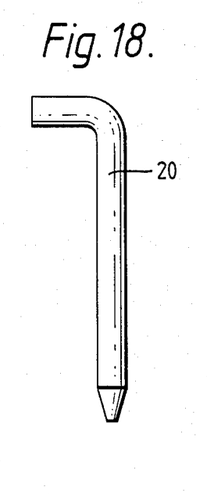
FIG. 18 is a side view of the clamping bolt used in FIG. 4 as an individual component.

By means of a cap screw 13 which passes through box casing 14, the first block 16 is fastened either close to the external side surface 40 or, in order to permit universal assembly, centrally with regard to the spar 41 formed by switching box casing 14, as can be seen in FIG. 5. For this purpose block 16 has an extended foot 43 with two threaded borings 42 for screw bolts 13. For precise stabilization the stop surface 45 can, as shown, have a circular or rectanglular aligning projection 47, see FIGS. 14 and 17.

Figure 10:
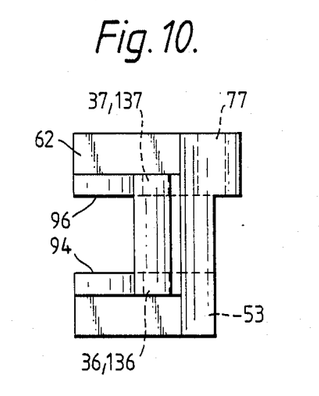
Figure 11:
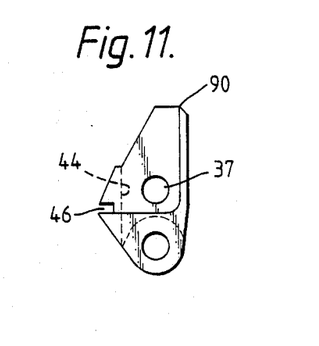
FIG. 11 is a bottom view of the block shown in FIG. 7.

In order to surround the vertical door leaf recess edge 28 in the link area 44 of the U, the second block has a first goove 46 (FIG. 11), and, in order to surround the horizontal door leaf recess edges 26, it can have an optional second groove 50 (FIG. 7) in an arm area of the U. One side of the optional groove 50 is formed by the blunt end of a wedge 54 increasing in the direction of application, so that U-shaped second block can be inserted into recess 18 in such a way that during penetration of edge 28 into groove 46 the edges of recess 18 are pushed onto the two opposite wedge-shaped projections 54, with the limbs of U-shaped part 24 being slightly pressed together, until the edges 26 catch in grooves 50 and thus adjoin on one side of the groove 52 and on the opposite side wall 56 of part 24. The second block 24 cannot accidentally fall out of recess 18, but it can be removed if necessary be pressing the limbs together. The second block 24 is always formed so that the edge 28 is covered by the strip 60 forming the first groove 46. This applies in the case of the front surface of the door leaf, whereas the curved side surface is correspondingly covered by the projecting wall area (FIG. 10).

FIG. 5 shows that hinge 10 is largely arranged in the dead space of the edge area of a switching box door. This edge area is also available on the door leaf and in certain circumstances on the door frame, because the edge serves as strengthening. It can also be seen that door leaf 12 is almost as large as box casing 14, the side of the hinge 66 being only slightly recessed, i.e. 1 to 3 mm with regard to the box casing side 40. Both blocks, which can be pivoted about axis 68 are designed in such a way that when in the closed position the link area 44 (FIG. 11) of the U-shaped second block 24, which is of a comparatively high material strength, almost rests on the corresponding side 72 (FIG. 14) of the first block 16, as can be seen in FIG. 5 at 74. The same applies for the open position at 180 degrees, which is shown by the broken line in FIG. 5, in which the link area 44 (near groove 46) almost rests on the opposite side 76 of the first block 16. In this way the hinge according to the invention simultaneously forms stop surfaces for the two extreme positions of door 12, these surfaces being slightly beyond the pivotting range of 180 degrees.

Figure 19:
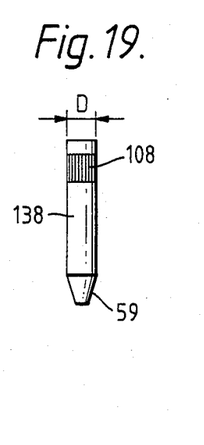
FIG. 19 is a side view of the bearing bolt used in FIG. 4.
Figure 19A:
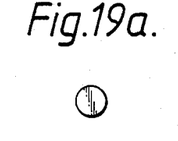
FIG. 19a is a bottom view of FIG. 19.

As can be seen from FIG. 5 when opened, the plane of door leaf 12 is displaced in such a way that the door leaf in the 180 degree open position is moved away from the box casing by a distance A. A box, represented by a broken line, located directly adjacent to the shown box permits full 180 degree opening of the door leaf 12 if the box also has the projecting hinge form when the door is closed. This is achieved through the arrangement of a boring 68 and thus the axis of rotation of the hinge is not only outside the corner area 30 formed by the edge 22 of door leaf 12 (FIG. 3) but also the axis of hinge bearing bolt 138 is at a distance M from the door leaf's external surface 78, which corresponds to distance N between the bearing bolt axis and the tangent 80 parallel to the door leaf's external surface 78 at the furthest projecting bearing part, see FIG. 5. FIG. A (corresponding to 2M), which projects via the door leaf's external surface, can be kept as low as possible, by selecting distance M, in accordance with the embodiments of the aforementioned DE-OS 32 46 398, smaller than the otherwise selected half setting width B, see FIG. 14, which normally is much larger, more particularly twice as large as diameter D (FIG. 19) of the hinge bearing bolt 138. Distance M can be made smaller if the mid point of the boring 68 is, as shown in FIG. 5, displaced outwards by a measure selected so that there is still sufficient material between boring 68 and the surface, adjoining tangent 80, with the result that stability is affected negatively to a minimum extent, see reference number 75 in FIG. 14a.

Such a measure would reduce A without negatively affecting the 180 degree pivotting in series arrangements.

Figure 2:
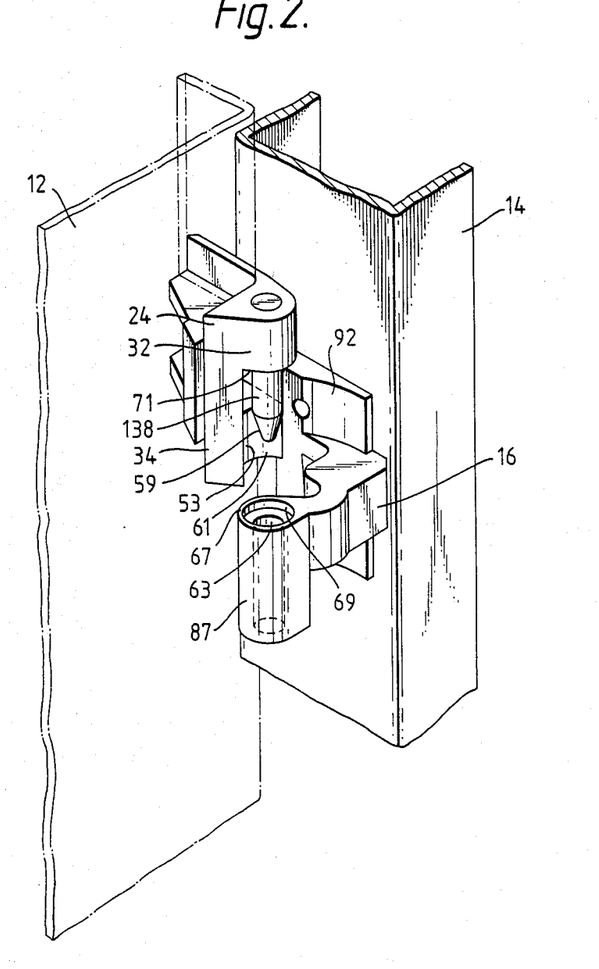
FIG. 2 is a similar view to FIG. 1 with the hinge when taken apart.
Figure 7A:
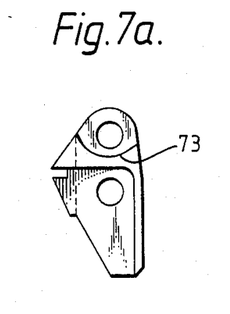
Figure 8:
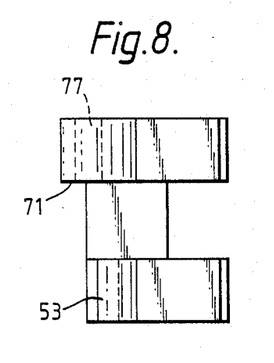
FIGS. 8, 9 and 10 are respectively right, top and left views of the block shown in FIG. 7.
Figure 9:
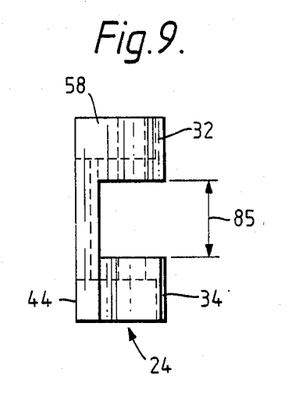

In order to achieve the described simpler dismantling of the door leaf without time-consuming removal of clamping bolts, locking screws and the like, the U-limb 34 of the second bearing block 24 is shortened in such a way that its end 53 surrounds the bearing bolt 138 held by the other U-limb 32 over an arc. This arc in FIGS. 2 or 7 is slightly less than 180 degrees and is given reference number 55 in FIG. 7, and is at a certain radial distance from the bearing bolt axis or bearing bolt circumference, said radial distance being given number 57. FIG. 2 in particular shows that the truncated cone tip 59 of bearing bolt 138 extends into this end area 53 of limb 34, but expediently leaves an inner circular surface 61 free at the lower end of second block 24, as in FIG. 2, so that the first block 16, seen separated from the second block 24 in FIG. 2, can, with its projection 69 containing the bearing eye 63, be inserted into the semicircular recess, formed by end 53 of U-limb 34, without being hindered by the bearing bolt 138. At this point surface 61 of second bearing block 24 provides very much facilitated fixing for the assembly of first bearing block 16. In particular the simultaneous alignment of several such hinges which may be present on a metal box becomes very simple. After aligning these hinges the door leaf 12 can then be displaced with regard the box body 14—for example through the weight of the door leaf 12—in such a way that bearing bolt 138 can, with its conical tip 59 which facilitates threading, be inserted into the bearing eye or boring 63 until the upper end surface 67 of projection 69, which annularly surrounds bearing eye 63 and takes in radial distance 57 in this position, rests against the inner surface 71 of the U-limb 32 in the circumference area of bearing bolt 138. This means that the first bearing block 16 has, in the area of its bearing eye 63, a cross section which, in a particular pivotting position, corresponds to an open door as in FIG. 2, with regard to the second bearing block 24. This allows for penetration through the radial gap 57. This particular pivotting position can correspond to a door opening angle of approaching 180 degrees for example, with a larger range of between 150 to 190 degrees or 170 to 180 degrees being provided to facilitate finding this pivotting position. With the example shown in FIG. 4 for a radial gap 57 forming an annular ring in accordance with FIG. 7, a comparatively large clearance range can be achieved, for example in the given example 100 to almost 180 degrees. By changing the shape, however, other clearance angle ranges with regard to the door opening angle can be realized, for example, by deviating from the circular shape, as can be seen in connection with FIGS. 14a and 7a under reference number 73 and 75. The narrowed space shown as 73 in FIG. 7a for a correspondingly narrower area 75 (FIG. 14a) for the the bearing eye area of projection 69 produces a cleared door opening angle of 170 to 180 degrees for example.

Expediently, bearing bolt 138 is held in a through boring 77 or in a corresponding pocket boring that is not shown. The pocket boring is in the unshortened U-limb 32 of the second bearing block 24 and holds the bearing bolt by means of press fitting, whereby in order to produce this press fitting the provision of strengthening with ribs 108 (FIG. 19) may be necessary.

Figure 14:
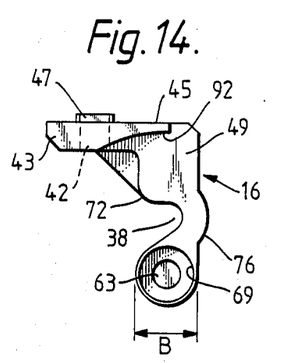
FIGS. 14 and 14a are top views of the first block of the hinge according to the invention in accordance with FIG. 3 in two variants.
Figure 14A:
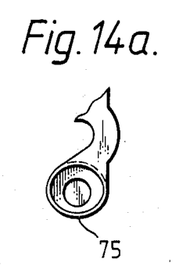
Figure 15:
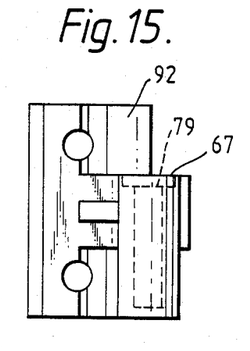
FIG. 15 is a back view of the block in FIG. 14.
Figure 16:
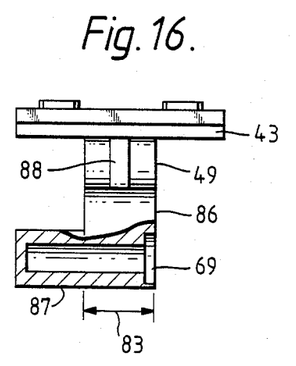
FIG. 16 is a partially cut-away side view of the block in FIG. 14.
Figure 21:
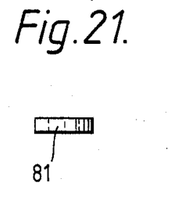
FIG. 21 is a side view of the slide ring shown in FIGS. 4 and 6 for reducing friction.
Figure 21A:
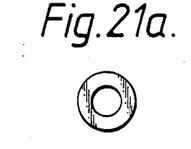
FIG. 21a is a bottom view of FIG. 21.

As can be seen from FIGS. 14, 15 and 16, the first bearing block 16 is provided with a ring-shaped recess 79 in the support area 67 of its bearing eye 63, into which a slide ring, for example an appropriate synthetic ring 81 as shown in FIG. 21 can be inserted. The sythetic ring 81 has a slightly greater thickness than the depth of the ring-shaped recess 79, so that when it is inserted it projects slightly above the level of the end surface 67 and thereby the inner surface 71 of the second bearing block does not rest on the metal surface 67, causing rotational friction, but instead rests on the upper surface of the synthetic ring 81 which produces substantially less friction. Through the synthetic ring 81 having a certain degree of compressibility, better support pressure distribution on the several hinges of a door leaf is achieved.

Sufficient for the basic functioning of the 180 degree hinge for switching boxes are a first bearing block which consists of the already described foot 43—which can be extended as in FIG. 5—, a body 49 starting at the foot of width 83 fitting into the gap 85 (FIG. 9) between the two U-limbs 32, 34, as well as a neck 86 also of width 83 starting from body 49 and being curved and having a recess 38 for the clamping bolt, and a projection or head 69, again of width 83, supported by the neck and forming bearing eye 63. Of course the shown embodiment also comprises a "downward" extension of head 69, this extension 87 permitting the possibility of completely surrounding the bottom end of bearing bolt 138. This has aesthetic advantages, as the hinge aquires a symmetrical appearance in that the shortening area of the shortened limb 34 of second bearing bolt 24 is visually filled out by projection 87. A technical advantage is that the entire length of the bearing bolt 138, except for conical tip 59, is in the boring of the bearing eye 63. With correct dimensioning between the inner circular surface 61 of the second bearing block and projection 87 the door bearing is stabilized, and even if the bearing bolt 138 is removed the door maintains its perfect fixing. A further technical advantage is that the boring of the bearing eye 63 can be in the form of a pocket boring which is open at the top, thus forming a suitable store for lubricants. In addition, the bolt cannot be accidentally knocked out.

FIGS. 14, 15 and 16 also show that body 49 can also be strengthened by means of strengthening rib 88, which is an advantage with wide foot extension 43.

In order to create space for the ends 90 in the area of the extending foot 43 when the door is being closed, an arc-shaped recess is provided in the foot, see 92. If the foot is only as wide as the body 49, i.e. width 83, this feature is omitted.

Figure 6:
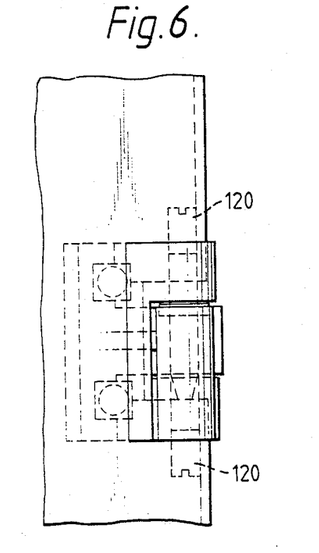
FIG. 6 is a similar view to that in FIG. 4 but using locking screws as a clamping bolt device.
Figure 20:
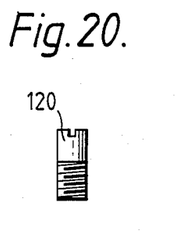
FIG. 20 is a side view of the screws used in FIG. 6.
Figure 20A:
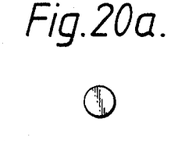
FIG. 20a is a bottom view of FIG. 20.

Curved neck 86 with its thus formed recess 38 can be replaced with a straight neck without recess 38 if locking screws 120 are used instead of the clamping bolt 20, see the individual component illustration of the embodiment in FIGS. 20 and 6. Because these bolt-shaped locking screws 120 can be of a type which can be screwed into corresponding threaded borings 136, 137 (see FIG. 10) in such a way that they do exceed the levels of inner surfaces 94,96 of both U-limbs 34,32, the movement of the first block 16 is thus no longer hindered if recess 38 is not present.

Figure 13:
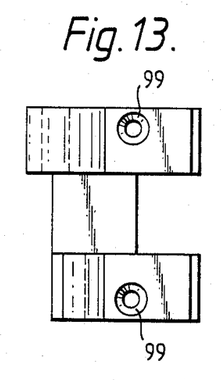
FIG. 13 is a view similar to that in FIG. 8 but of the embodiment in FIG. 12.

In place of clamping bolt 20 or locking screws 120 fixing of the second U-shaped block 24 in the door leaf recess 18 can also be carried out by means of cap screws passing through the metal of door leaf 12 (see corresponding threaded borings 98 in FIG. 3), for example by means of coutersunk screws not illustrated here, which are passed through the appropriate countersunk borings 99 (see FIGS. 12 and 13). In this case the hole 36, which would be smooth if a clamping bolt were being used or which would have an internal thread for locking screws, can be omitted, as in FIG. 12.

The bearing components, particularly the first and second bearing blocks 16, 24 are preferably cast in a suitable metal, for example zinc die-casting, while the bolts and locking screws (grub screws) can be made of round steel.

Figure 22:
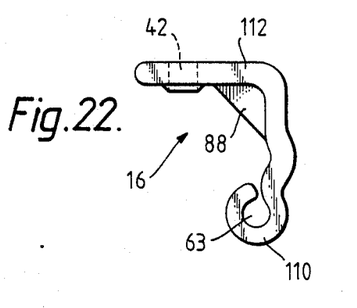
FIG. 22 is a top view of the first block as a cut component.

With lesser stability requirements, such as for so-called motor control centres (MCC), the second block can, in order to reduce costs, be molded from a tough plastic (thereby eliminating slide ring 81), whereas the first bearing block 16 would be produced from a metal stamping, see FIG. 22, in which the bearing boring 63 is formed by a metal roll 110 and the support surface 45 by a metal angle 112, with a socket having a thread 42. If it is steel sheet 2.5 to 3 mm thick, this produces adequate stability, especially if a stiffening bead 88 is provided for the angle formed by the component. If stronger steel is used as the starting material for stamping, the appropriate dimensions can be obtained by pressing material away.

Instead of the threaded socket a threaded bolt can be firmly pressed into boring 42 in FIG. 22, or, if the boring 42 is threaded, screwed in.

I claim:

1. An externally visible 180 degree hinge for switch boxes comprising a box casing with a front surface plane, a first bearing block attached to the box casing and being against the front surface, a second bearing block which surrounds a projection of the first bearing block, the second bearing block being U-shaped and fixed to a door leaf, the second bearing block being inserted into a recess in an edge area of the door leaf thereby surrounding recess edges of the door leaf so as to provide an axis of rotation outside a corner of the door leaf, wherein a shortened U-limb of the U-shaped second bearing block is shortened in such a way so as to have an end surrounding a bearing bolt held by an unshortened U-limb over a predetermined angle of rotation at a radial distance from the bearing bolt, the projection of the first bearing block having a bearing eye which annularly surrounds the bearing bolt by a radial distance, the door leaf and the second bearing block being arranged so as to remain at all times outside of the front surface plane of the box casing.

2. A 180 degree hinge according to claim 1 wherein the first bearing block has a cross section at the bearing eye and has a certain position with regard to the second bearing block corresponding to an open door which allows the cross section to be pushed through a space formed by the radial distance which is variable in a direction of swing.

3. A 180 degree hinge according to claim 2 wherein the door has a pivot position which corresponds to a door opening angle within 150–190 degrees.

4. A 180 degree hinge according to claim 1, wherein the shortened U-limb of the second bearing block is assembled as a lower limb.

5. A 180 degree hinge according to claim 1, wherein the bearing bolt is held in a boring in the unshortened U-limb of the second bearing block by means of press fitting and is in a shape of a truncated cone from a free end of the second bearing block.

6. A 180 degree hinge according to claim 5, wherein the bearing bolt is of such a length that the free end still terminates within the shortened U-limb and thus leaves a preliminary fixing surface free.

7. A 180 degree hinge according to claim 1, wherein the bearing eye of the first bearing block has a support area for the attachment, the support area having an annular recess for accommodating a sliding ring made for reducing friction between the first and second bearing blocks.

8. A 180 degree hinge according to claim 1, wherein the first bearing block forms an extension surrounding the free end of the bearing bolt, the extension essentially filling free space left by shortening of the shortened U-limb of the second block when the hinge components are in operation.

9. A 180 degree hinge according to claim 1, wherein the second bearing block is attached in the recess by means of cap screws through metal of the door leaf.

10. A 180 degree hinge according to claim 1 wherein a clamping bolt arrangement penetrating through the hinge and extending from the recess into the corner formed by the edge and thus firmly holding the second block in the recess, the clamping bolt arrangement being provided with two locking screws which are screwed into threaded borings of the U-limbs of the second bearing bolt.

11. A 180 degree hinge according to claim 1, wherein the first bearing block is a stamping component in which the bearing eye is formed by a metal roll and a fixing surface of the first bearing block is formed by a metal angle into which a threaded portion is provided.

12. A 180 degree hinge according to claim 11, wherein the second bearing block is molded from plastic.

13. A 180 degree hinge according to claim 1, wherein the first bearing block has a foot which can be fixed to the casing body by means of a fixing device having an axis lying outside parts of the first bearing block which hold the bearing eye, the parts with the foot being strengthened by means of a strengthening element.

14. A 180 degree hinge according to claim 13, wherein the foot of the first bearing block has a greater axial extension than the parts, the parts being supported by the foot, the foot having, a plurality of fixing arrangements outside the parts.

15. A 180 degree hinge according to claim 14 wherein the fixing arrangements are arranged so that corresponding fixing points on a spar of the casing body lie centrally.

16. A 180 degree hinge according to claim 1, wherein said second bearing block is bolted to the door leaf.

17. A 180 degree hinge according to claim 1; further comprising means for clamping said second bearing block to the door leaf.

18. A 180 degree hinge according to claim 3, wherein said pivot position corresponds to the door opening angle of almost 180 degrees.

19. A 180 degree hinge according to claim 3, wherein said pivot position corresponds to the door opening angle within 170–180 degrees.

20. A 180 degree hinge according to claim 1, wherein said radial distance is constant.

21. A 180 degree hinge according to claim 1, wherein said radial distance is variable.

* * * * *